United States Patent Office 3,336,524
Patented Aug. 15, 1967

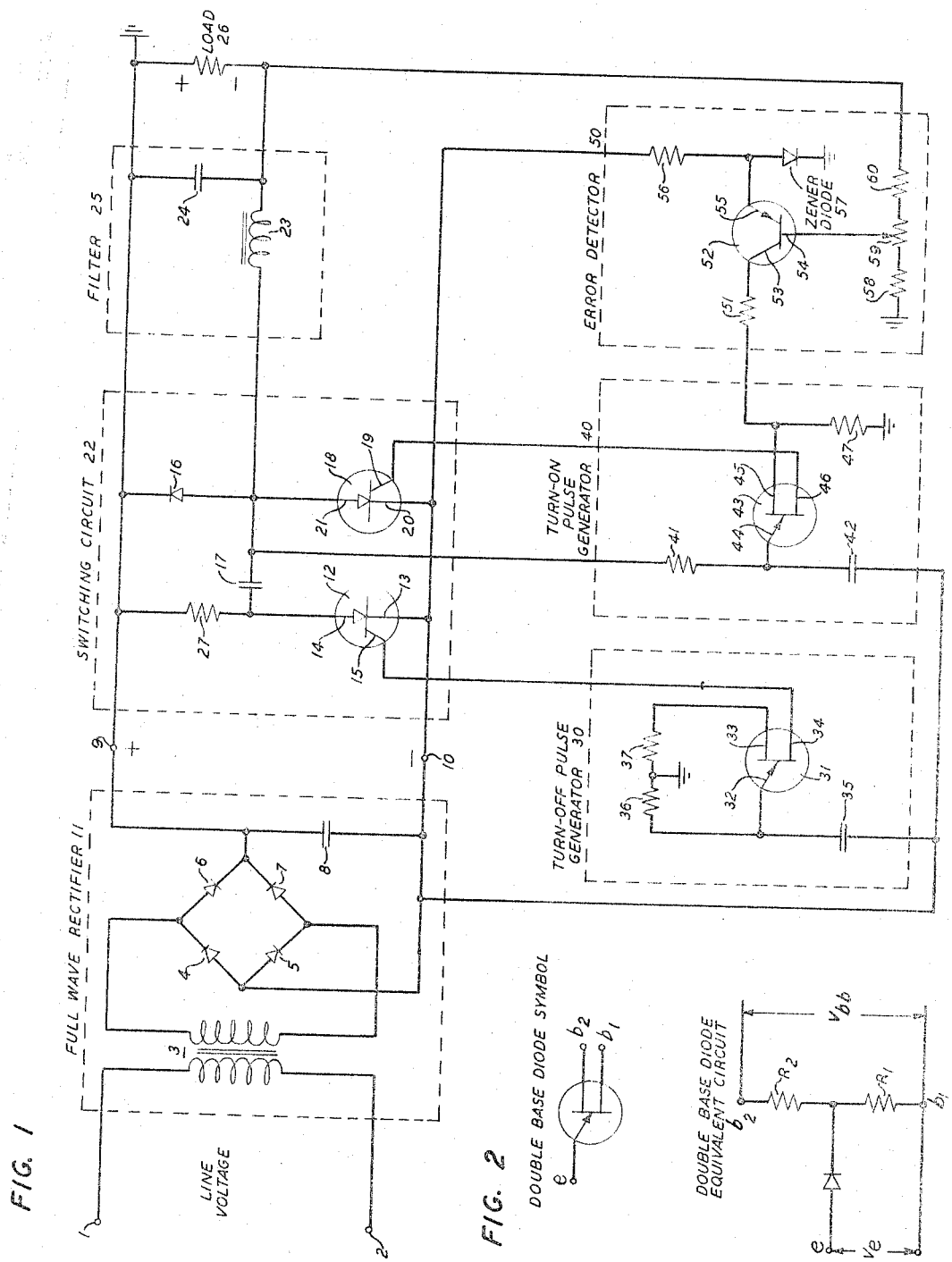

3,336,524
PNPN SWITCHING REGULATOR
Robert J. Healey, Fanwood, N.J., assignor to Bell Telephone Laboratories, Incorporated, New York, N.Y., a corporation of New York
Filed Dec. 19, 1960, Ser. No. 76,726
17 Claims. (Cl. 323—22)

This invention relates to voltage supply apparatus and, more particularly, to improvements in regulated power supplies.

The power supply disclosed in this application incorporates the relatively new thyratron-like element, the solid-state three-terminal PNPN switch. Such PNPN switches have been described by I. M. Mackintosh in the Proceedings of the I.R.E., vol. 46, No. 6, pages 1229 through 1235. Their use in various circuits and in particular as rectifiers in regulated power supplies has also been described by R. P. Frenzel and F. W. Gutzwiller in Electronics, vol. 31, No. 13, pages 52 through 55, and by F. W. Gutzwiller in Control Engineering, vol. 6, No. 5, pages 113 through 119.

In much of what has been written about the PNPN switch, reference has been made to its "thyratron-like" properties. From the standpoint of control, however, the PNPN switch is actually more akin to an ignitron. The device is current, not voltage controlled, and the control or gate impedance is low. As the voltage across the cathode and anode electrodes of the switch is increased, the forward current increases. When a critical forward breakdown voltage is exceeded, the voltage across the device drops and the current is limited essentially by the series load impedance. A current pulse applied to the third electrode, the gate, switches the PNPN element to the low voltage or high conduction state without the necessity of exceeding the critical breakdown voltage. The device can be fired by pulses of extremely short duration. Unlike the thyratron in which the firing power generally applied is positive grid-to-cathode voltage, in the PNPN switch it is positive gate-to-cathode current since the firing mechanism of the switch is dependent on current rather than voltage. After the gate current fires the switch it no longer exercises any control function. The switch continues to conduct with an approximately constant anode-cathode voltage for all values of load current. When the current is decreased below a minimum value known as the holding current, or the anode-cathode voltage is made negative, the switch is turned off. It will conduct again when either the breakdown voltage is exceeded or the gate electrode is triggered from a source of current pulses (provided the anode-cathode voltage exceeds that of the low conduction state).

Conventional direct current controlled regulated power supplies generally exhibit a minimum 120 cycle ripple frequency across the load. A filter must be incorporated to remove the ripple frequencies. The size and cost of the choke in such filters is generally inversely proportional to the lowest frequency to be filtered. In conventional regulated power supplies the chokes are necessarily quite large as 120 cycles per second is a relatively low frequency.

A regulated power supply in which the minimum frequency to be filtered is much greater than 120 cycles would be highly desirable for the filter choke would be both smaller and more economical than those generally required in the prior art. This can be achieved by utilizing PNPN switches in the regulating circuit in accordance wth the principles of this invention.

Accordingly, it is an object of this invention to provide an improved regulated power supply.

Another object of this invention is to provide a power supply wherein the minimum output ripple frequency to be filtered is considerably greater than twice the line frequency.

Still another object of this invention is to provide a more economical and smaller choke in the output filter of a regulated power supply.

Still another object of this invention is to provide a high efficiency switching type regulator with improved frequency response.

In my copending application Ser. No. 831,870, filed Aug. 5, 1959, now Patent No. 3,116,446, a PNPN switching regulator is disclosed. During every half cycle of line voltage one of two PNPN switches supplies a current pulse to the load. A filter circuit is interposed between the current supplying switches and the load and removes the 120 cycle ripple contained in the pulse wave form. A constant or quiescent output voltage across the load is obtained. The load voltage is dependent upon the current pulse width in each cycle of switch operation. To maintain a constant predetermined output voltage, the load voltage is compared to a reference voltage. Differences in the load and reference voltages result in a varying on-off time ratio in each cycle of switch operation in such a manner that the output voltage is maintained equal to the desired value.

The current pulses in this circuit of my copending application occur at a rate that is twice the line frequency. The filter circuit must, therefore, remove frequency components as small as those in conventional power supplies.

The present invention permits the operation of the current supplying switch at a frequency much greater than twice that of the line. In the illustrative embodiment of the invention the current supplying switch operates at a frequency of 5 kc. The on-off times ratio in each cycle is controlled by comparing the output voltage to the desired reference voltage.

Variations in the load voltage due to the ripple frequencies of the line appear approximately quiescent to each cycle of the switching circuit as the frequency of this circuit is so much greater than that of the line. Thus, a variation in the output voltage due to the line ripple results almost instantaneously in a different value of average current being supplied by the switch to the load because the period of conduction in each cycle of switch operation is immediately altered. By causing this change in on-off time ratio to vary in such a manner as to correct the error in the output voltage, a constant output voltage is obtained.

Ripple in the output resulting from the alternating line voltage is thus corrected not by a filter circuit but by the instantaneously controlled variation of conduction time of the current supplying switch in each cycle of operation. The current pulses, however, no matter what their pulse width, occur at a 5 kc. rate and in order to achieve a quiescent load voltage it is necessary to filter these pulses and remove all harmonics of the 5 kc. wave form. A filter must consequently still be interposed between the current supplying switch and the load. However, because the filter must remove a minimum frequency of only 5 kc. rather than 120 cycles the size and cost of the filter choke is correspondingly reduced.

In the illustrative embodiment of this invention a flip-flop is incorporated. The load impedance is connected through a filter to the anode of one of the two PNPN switching elements and in the ON state current is supplied to the load from this anode. The flip-flop circuit is biased by a full wave rectified voltage obtained from the line. Current pulses are supplied to the load from the aforesaid anode at a constant 5 kc. rate. The load voltage is compared to the reference voltage of a Zener diode and a difference between the actual load voltage and the desired load voltage results in an instantaneous change of the period of conduction, i.e., the duration of the ON state in each cycle of the flip-flop operation, in such a manner that the output voltage reverts to the desired value.

Specifically, the flip-flop is turned off at fixed intervals, these intervals being illustratively 1/5000 or .0002 seconds by a turn-off pulse generator. At some time between successive turn-off pulses a turn-on pulse generator supplies a pulse to the current supplying PNPN switch which causes the flip-flop to be turned ON and current to be supplied to the load. The precise time of application of the turn-on pulse between successive turn-off pulses is determined by an error detector which compares the actual load voltage to the desired value.

For example, if the load voltage suddenly decreases in magnitude due to a change in the line voltage or a variation in the load itself, the error detector causes the turn-on pulse generator to supply turn-on pulses to the flip-flop element at an earlier time in each cycle. This results in a greater on-off time ratio with a corresponding increased average current being supplied to the load. If, on the other hand, the load voltage is increasing, the error detector causes the turn-on pulse generator to apply a turn-on pulse to the flip-flop element that is closer in time to the succeeding turn-off pulse. Thus, the pulse width in this end succeeding cycles is smaller and the load voltage is reduced to the desired value.

The switching circuit utilized in the illustrative embodiment is a flip-flop comprising two PNPN switches. In conventional flip-flops, one, and only one, of the active elements conducts in each of the stable states. Current is supplied to the load in this invention from the anode of only one of the PNPN switches, this occurring during the ON state of the device. In the OFF state, current is not supplied to the load from that anode. Whether or not the second switch conducts in the OFF state does not affect the output voltage as its current is not directed to the load. It is manifest that if in the OFF state neither switch conducts, a high efficiency regulator is obtained for no power is wasted in this state. Thus, in the illustrative embodiment, in the OFF state neither switch conducts while in the ON state only that switch whose anode is connected to the load impedance is conducting. The nonconducting switch serves only to cause the current supplying switch to cease conducting.

It is a feature of this invention to provide means for causing the regulating circuit in a switching voltage regulator to switch at a frequency independent of and considerably greater than twice the line frequency.

It is another feature of this invention to provide means for comparing the load voltage in a regulated power supply to a reference voltage.

It is a further feature of this invention to provide means for causing the switching regulating element to commence conducting in each cycle in accordance with the difference of the load and reference voltages.

It is still a further feature of this invention to provide means for causing the nonconduction of both active elements in a bistable device during one of the two stable states.

These and other objects, features and advantages of the invention will appear more clearly and fully upon consideration of the following specification taken together with the drawing in which:

FIG. 1 is a schematic circuit diagram of a regulated power supply in accordance with the present invention; and FIG. 2 shows the symbol and equivalent cricuit of the double-base diodes incorporated in the circuit of FIG. 1.

*General description*

Referring now to FIG. 1, the line voltage is connected to terminals 1 and 2 of full-wave rectifier 11 and a fully rectified voltage is obtained between terminals 9 and 10. This is the biasing voltage for the flip-flop circuit, switching network 22 in which PNPN switch 18 is the current supplying switch to load 26.

Turn-off pulse generator 30 supplies pulses to gate 15 at a fixed 5 kc. rate. These pulses cause switch 18 to become nonconductive. Turn-on pulse generator 40 supplies pulses between successive turn-off pulses. These pulses, however, do not occur at fixed times. It is these latter pulses that determine the period of conduction of switch 18 in each cycle as explained in detail herein.

Filter 25 smooths the current pulses from anode 21 and causes a ripple-free current to flow through load 26. The direct voltage across the load is compared in error detector 50 to the desired value. The difference in these two voltages determines the application time of the turn-on pulse from generator 40 in each cycle which in turn causes the output voltage to be maintained constant.

The relatively slow varying 120 cycle ripple across terminals 9 and 10 does not appear at the output. The period of conduction of switch 18 in each cycle changes immediately under control of error detector 50 in response to the slow varying input voltage and the switching circuit provides a different current pulse width to maintain the output voltage constant. The switching circuit, therefore, corrects the 120 cycle ripple. The only remaining ripple to be corrected is that introduced by the switches themselves and this is accomplished by causing the current pulses to pass through filter 25 before load 26. The minimum ripple frequency to be filtered is 5 kc. rather than 120 cycles and great economy is achieved in the size and cost of the filter choke.

Having explained the circuit in general form, the various component circuits will now be described in detail.

*Full-wave rectifier 11*

This circuit operates in the conventional manner. Terminal 10 is always negative with respect to grounded terminal 9. Capacitor 8 tends to prevent the voltage appearing across its terminals from varying and thus tends to smooth in part the fully rectified voltage wave form.

The full-wave rectified voltage appearing between terminals 9 and 10 contain many ripple harmonics, the lowest of which is twice the line frequency. It is these harmonics that most regulated power supplies aim to suppress.

*Switching circuit 22 and filter 25*

Switching circuit 22 is a flip-flop that provides for increased efficiency of the regulating circuit. In the ON state, switch 18 supplies current to the load and switch 12 is off. In the OFF state neither switch conducts. Switch 12 when turned on causes switch 18 to go off and then immediately ceases to conduct as well. Thus, in the OFF state neither switch conducts, no energy is dissipated and increased efficiency results.

Filter 25 affects the operation of switching circuit 22 and for this reason their operation must be explained with reference to each other. The sequence of operations in the switching circuit and filter will now be described.

*ON state—switch 18 conducting and switch 12 off*

Terminal 9 is at ground potential as shown in FIG. 1. It will be assumed in the following description that during one cycle of flip-flop operation terminal 10 is at a constant potential of −V volts. This is a valid approximation because the frequency of flip-flop operation is so much greater than that of the line.

If the voltage drop across a PNPN switch in the forward conducting direction is approximately zero, anode 21 of switch 18 is at the −V volts potential of terminal 10. Switch 12 is nonconducting and consequently, after capacitor 17 is fully charged, no current is drawn through resistance 27. Anode 14 is thus at ground potential and the right-hand side of capacitor 17 is negative with respect to the left-hand side by approximately the potential difference between terminals 9 and 10.

As anode 21 is negative with respect to ground potential, diode 16 is reversed biased and does not conduct. The only current flowing in the circuit is from ground through load 26 and filter 25, through switch 18 to negative terminal 10.

This is the state of the circuit when current is being supplied by switch 18 to load 26.

*Turn-off pulse applied by generator 30 resulting in switch 18 being turned off*

Turn-off pulse generator 30 applies turn-off pulses to gate 15 of switch 12 at a fixed 5 kc. rate. When a turn-off pulse is applied to gate 15, switch 12 is turned on and anode 14 immediately assumes the potential of terminal 10, —V volts. The voltage across a capacitor cannot change instantaneously and thus the right-hand side of capacitor 17 must also exhibit a negative step in voltage of —V volts. Anode 21 thus drops from —V volts to —2V volts. Switch 18 is reverse-biased and ceases to conduct.

*Automatic turn off of switch 12*

Immediately subsequent to the turn-off pulse, anode 14 is at a potential of —V volts and current flows from ground through resistance 27 into switch 12. Anode 21 is at a negative potential of —2V volts and consequently neither diode 16 nor switch 18 conduct as they are both reverse-biased. Inductor 23, however, continues to supply current to the junction of capacitor 17, diode 16, and switch 18. This is due to the fact that the current through a choke cannot cease abruptly. As neither switch 18 nor diode 16 conducts, the current supplied by choke 23 can only serve to charge capacitor 17. This charging process continues until the right-hand side of capacitor 17 charges from —2V volts to ground potential. At this time diode 16 is forward-biased and the choke current is supplied not to capacitor 17 but to load 26 via diode 16.

This is the manner in which filter 25 smooths the current pulses supplied by switch 18. The current through an inductor tends to remain constant and thus when switch 18 is turned off the inductor supplies the current to the load. Capacitor 17 charges rapidly and choke 23 then supplies current to load 26 that is approximately equal to the previously flowing current from switch 18. Capacitor 24 of filter 25 tends to smooth the load voltage even further.

For switch 12 to maintain conduction it is necessary that the current through it exceed the minimum value known as the holding current. This current flows through switch 12 and resistance 27 after the application of the turn-off pulse. When the right-hand side of capacitor 17 charges to ground potential and diode 16 conducts, capacitor 17 momentarily supplies current to diode 16. This current can only come from the current being supplied to switch 12 through resistance 27. Thus, the current is momentarily diverted from switch 12 and the current through this switch is less than the holding current. Switch 12 ceases to conduct.

Capacitor 17 continues to discharge through diode 16 and resistance 27 until the next turn-on pulse is applied. Thus, after switch 12 turns off switching circuit 22 is in the OFF state. In this state neither switch conducts. Choke 23 supplies the load current through diode 16.

*Turn on of switch 18*

At a time determined by error detector 50 turn-on pulse generator 40 supplies a turn-on pulse to gate 19 of switch 18. This pulse causes switch 18 to conduct and anode 21 to assume the negative potential of terminal 10, —V volts. Diode 16 is reverse-biased and current flows from ground, through load 26 and filter 25 to switch 18. This is the ON state of switching circuit 22 in which current is supplied to load 26 by switch 18.

It should be noted that when switch 18 is turned on and anode 21 assumes the negative potential of —V volts, the step is transmitted to anode 14 through capacitor 17 which likewise is placed at —V volts. Current flows from ground through resistance 27, capacitor 17 and switch 18. When the left-hand side of capacitor 17 charges to ground potential this current ceases to flow as there is no voltage drop across resistance 27. The only current flowing is that from ground through load 26 and filter 25 to switch 18.

Anode 21 is at —V volts and anode 14 is at ground potential. The turn-off pulse is now applied to gate 15 as described above and another cycle of operation ensues.

*Turn-off pulse generator 30*

It has previously been stated that the relative off-on times of switch 18 is dependent upon the load voltage. The switch 18 is turned off at a constant rate of 5 kc. It is turned on during each period at a time dependent upon the load voltage. The variation of the period of conduction of switch 18 corrects any ripple in load 26 that might arise from either changes in the load itself or the ever-present variation in unregulated potential between terminals 9 and 10.

Turn-off pulse generator 30 and turn-on pulse generator 40 incorporate double-base diodes. The operation of those diodes may be understood upon consideration of the equivalent circuit shown in FIG. 2. The unit consists of a single bar of semiconductor material with one PN junction situated near the center of the bar. It has three terminals; base $b_1$, base $b_2$ and the emitter $e$. In the equivalent circuit the resistive bar which extends between the terminals connected to base 2 and base 1 may be thought of as consisting of two resistors, R1 and R2, which form a voltage divider. The ratio of the voltage division is a parameter of the device and is called the intrinsic stand-off ratio, $\eta$. When a voltage, $V_{bb}$, is applied between base 2 and base 1, a voltage $\eta V_{bb}$ will appear on the base side of the emitter junction. When the emitter voltage, $V_e$, exceeds this voltage, current flows from the emitter through the diode to base 1 and the resistance $R_1$ is reduced by conductivity modulation. The device can then be said to have broken down.

Turn-off pulse generator 30 is a simple relaxation oscillator circuit incorporating double-base diode 31. Current flows from ground into capacitor 35 with a time constant equal to the product of resistance 36 and capacitance 35. Base 33 of double-base diode 31 is connected through resistor 37 to ground. Base 34 is connected to terminal 10 through the gate-cathode path of PNPN switch 12. (It should be noted that a PNPN switch provides a current path from the gate to the cathode even in the off state. It is when the current through these two electrodes exceeds a minimum value that the device breaks down.)

Thus, if terminal 10 is at a potential of —V volts the double-base diode will conduct when emitter 32 is at a potential greater than —V by at least $\eta V$ volts or when emitter 32 is at a potential greater than $(\eta-1)$ V volts. Capacitor 35 charges to this potential from —V volts. The double-base diode fires and the capacitor discharges through the emitter 32-base 34 path into gate 15 of PNPN switch 12. This causes switch 12 to conduct and switch 18 to turn-off.

Capacitor 35 discharges into gate 15 which is at a potential of —V volts. When the capacitor discharges to this value it can supply no more current. Current can only come from ground through resistor 36 into emitter 32. Resistor 36 is made large and only a small current flows through it. A double-base diode remains on after breaking down only if a current greater than a minimum value called the "valley point current" is supplied to the emitter. The current through resistor 36 is less than this minimum value and the double-base diode ceases to conduct. At this point capacitor 35 begins to recharge once again from —V volts to that value required to break down double-base diode 31.

In this manner, turn-off pulse generator 30 supplies current pulses to switching circuit 22 at a fixed rate, determined only by the time constant of the charging path comprising resistor 36 and capacitor 35. An advantage of this oscillator is that the frequency is relatively independent of the potential of terminal 10. It is obvious from the operation of pulse generator 30 that were terminal 10 at any constant voltage the frequency would still be determined only by the above-mentioned time constant. This is because emitter 32 increases in potential according to an exponential function. It approaches ground potential but after any given time the voltage on base 32 is a fraction of the voltage −V that is independent of the magnitude of V. Double-base diode 31 breaks down when emitter 32 is at a particular fraction of the voltage V. Thus, no matter what the particular magnitude of V is, the double-base diode fires at a fixed time after the charging process begins.

In actuality, voltage V is constantly changing because the wave form across terminals 9 and 10 is unregulated. However, the frequency of pulse generator 30 is so great compared to twice the line frequency that during any charging cycle of capacitor 35, voltage V appears quiescent. Similar remarks apply to the discussion above relating to the operation of switching circuit 22. This circuit flips back and forth at a rate identical to that of turn-off pulse generator 30, namely, 5 kc. and during any cycle the potential on terminal 10 is approximately quiescent.

*Turn-on pulse generator 40*

Turn-on pulse generator 40 applies a current pulse to gate 19 of switch 18 for turning ON switching circuit 22. It has already been explained that this pulse is applied after the turn-off pulse at a time determined by the instantaneous load voltage.

Turn-on pulse generator 40 is similar to turn-off pulse generator 30. Its operation may be easily understood by considering that base 45 of double-base diode 43 is at a potential E. E varies in accordance with the instantaneous load voltage and regulation is obtained in this manner.

Base 46 of double-base diode 43 is connected through gate 19 and cathode 20 to terminal 10. Base 45 is at some positive potential E and thus if V is the negative potential of terminal 10, the potential drop from base 45 to base 46 is $(E+V)$. Double-base diode 43 fires when emitter 44 reaches a potential $\eta(E+V)$ greater than the potential of base 46.

Capacitor 42 charges through resistor 41 in the same manner as capacitor 35 charged through resistor 36. However, whereas turn-off pulse generator 30 is a self-contained unit whose charging cycle is independent of all other units in the regulated supply, capacitor 42 begins to charge only when switch 18 is turned off. The turn-on pulse is applied subsequent to the turn-off pulse after a time interval determined only by E. For this reason capacitor 42 is made to begin charging only after the turn-off pulse has turned switch 18 off.

Prior to the application of the turn-off pulse, switch 18 is conducting. In this state anode 21 is at approximately the potential of terminal 10. Thus, the potential across the series path comprising resistor 41 and capacitor 42 is approximately zero and no current flows in the charging path in this state. Immediately after the application of the turn-off pulse, anode 21 is at a potential of −2V volts. Choke 23 causes current to flow into capacitor 17 and charges it until anode 21 is at ground potential. At this point, diode 16 conducts and anode 21 remains connected to ground. Capacitor 17 charges rapidly and thus resistor 41 is connected to ground through diode 16 at a time which is small after switch 18 has been turned off.

Current flows from ground through resistor 41 and capacitor 42 to terminal 10. The junction of capacitor 42 and resistor 41 increases in potential with a time constant determined by the product of resistor 41 and capacitor 42. Emitter 44 is initially at a potential of −V volts. Double-base diode 43 fires when emitter 44 is at a potential greater than the potential of base 46 by $\eta(E+V)$ volts. As capacitor 42 charges the required voltage is attained and double-base diode 43 breaks down. Capacitor 42 discharges through the emitter 44-base 46 path and a pulse of current is applied to gate 19 turning switch 18 on.

Capacitor 42 discharges until emitter 44 is at a potential of −V volts. At this time double base diode 43 turns off. As switch 18 has been made conducting, anode 21 and therefore the top of resistor 41 are connected to terminal 10. Base 46 is likewise connected to terminal 10 through switch 18. Thus, there is no potential drop across resistor 41 and the emitter 44-base 46 junction. No current flows and double base diode 43 is turned off. Capacitor 42 will not initiate another charging cycle until switch 18 is turned off.

Resistor 47, connecting base 45 to ground is included in the circuit to insure self-starting of the regulator. When the line voltage is first connected to the regulator, base 45 is at ground potential and base 46 is at the potential of negative terminal 10. Thus, there is an initial voltage across the base terminals of double-base diode 43. Capacitor 42 charges when switch 18 is turned off and the double-base diode 43 breaks down as desired. Eventually, base 45 assumes some voltage E and turn-on pulse generator 40 operates as described.

The time required for capacitor 42 to attain the necessary voltage for firing double-base diode 43 is determined by the voltage E on base 45. This voltage is, in turn, determined by error detector 50.

*Error detector 50*

Capacitor 8 in full-wave rectifier 11 partially smooths the voltage wave form across terminals 9 and 10 so that the potential of terminal 10 while varying with respect to the ground potential of terminal 9 is never zero. It is always some negative value and varies between minimum and maximum levels. This negative potential is applied through resistor 56 to the anode of Zener diode 57. A Zener diode breaks down when a predetermined reverse voltage, i.e., the anode negative with respect to the cathode, is applied across it. When it does break down, the voltage across it is essentially constant and independent of the current drawn. The diode remains in this conducting state provided that the current exceeds a minimum value.

The current is determined solely by the circuit across the diode terminals. In the present case, the circuit across Zener diode 57 consists of resistor 56 in series with a supply voltage whose magnitude is equal to the potential of terminal 10. The current through resistor 56 is determined by the voltage across it, this being the difference between the supply voltage and the constant voltage across Zener diode 57. If the minimum supply voltage, i.e., the minimum negative potential of terminal 10 is of sufficient magnitude so that the minimum current drawn through resistor 56 is greater than the minimum current required for the maintenance of conduction in Zener diode 57, this diode will continuously conduct in the reverse direction. This is the case in error detector 50. (Additional current supplied by Zener diode 57 to emitter 55 has no effect on the diode's conduction as it merely further insures that the minimum current is exceeded.)

Thus, emitter 55 is maintained at a constant negative potential equal to the voltage drop across Zener diode 57.

Base 54 is connected to the variable arm of potentiometer 59. For a fixed setting of the arm of potentiometer 59, base 54 is at a negative potential proportional to the potential across load 26.

Transistor 52 is an amplifying circuit. When base 54 is more negative in potential than emitter 55, transistor 52 conducts. Transistor 52 is biased in the active region and as the magnitude of the emitter-base voltage drop varies, emitter-collector current changes. This current flowing through resistor 51 and double-base diode 43 causes a potential E at base 45. This potential is a function of collector current which, in turn, is solely a function of the base 54 potential because the emitter 55 is at a fixed potential due to the break down of Zener diode 57. The base 54 potential is, in turn, a function of the load voltage. Thus, the derived voltage E determining the conduction time in each cycle of flip-flop operation is a function only of the load voltage.

*Circuit operation*

When operating properly, the load voltage is constant at the desired value, the emitter-base junction of transistor 52 is forward-biased at some intermediate value and a corresponding collector current flows. This causes base 45 to assume some intermediate value of potential. This value determines the charging time of capacitor 42 and the relative conduction time of switch 18.

The voltage across load 26 can suddenly increase, due among other things, to either a variation in the load itself or an increase in the unregulated potential between terminals 9 and 10. This increase in load voltage causes the negative potential of the arm of potentiometer 59 to correspondingly increase in magnitude. The base-emitter junction of transistor 52 is biased more heavily in the forward direction. More collector current flows. This greater current causes base 45 to increase in potential.

Thus, double-base diode 43 will not fire until emitter 44 reaches a greater voltage than was necessary in the previous cycles. Capacitor 42 charges for a greater period of time and thus the turn-on pulse is applied at a time after the turn-off pulse that is greater than the times in the previous cycles. The conduction time of PNPN switch 18 is thus reduced in subsequent cycles and current is drawn from ground through load 26, filter 25 and switch 18 to terminal 10 for a smaller period in each of the subsequent cycles. This causes the output voltage to decrease in magnitude and the circuit thereby corrects the spurious increase in load voltage.

Similarly, if the load voltage decreases in magnitude less collector current flows through transistor 52 and voltage E is decreased in potential. Less time is required for capacitor 42 to charge sufficiently to fire double-base diode 43 and the duration of conduction of switch 18 in each cycle of operation is correspondingly increased. This tends to increase the load voltage to the desired value.

The transfer of conduction state in switching circuit 22 is so rapid compared to the line frequency that changes in load voltage due to line variations are corrected. The slow varying voltage between terminals 9 and 10 causes the conduction time of subsequent cycles of switching circuit 22 to be affected almost instantaneously and the ripple due to the line is thereby eliminated in the load.

It is important to note that the rectifier ripple frequencies are substantially corrected by the switching circuit 22. The filter 25 is not necessary for the filtering of these ripple voltages. However, switching circuit 22 has itself introduced new ripple components. A stepping wave form is being supplied by switch 18. This would cause an essentially square-wave voltage output. The filter 25 is necessary for filtering out this 5 kc. wave form. The minimum ripple frequency to be filtered is now 5 kc. rather than 120 cycles per second as in conventional power supplies and the size and cost of choke 23 is reduced significantly.

By varying the arm setting of potentiometer 59, the circuit may be adjusted to provide various regulated outputs. For example, if the arm is moved to the left the forward bias of the emitter-base junction of transistor 52 is decreased. Less collector current flows and the charging period of capacitor 42 is decreased. The on-time of switching circuit 22 increases and the regulated output is greater.

In addition to being a voltage regulator with high efficiency, the circuit may also be used as a transformerless direct current to direct-current converter. As unregulated supply, for example, might be placed across terminals 9 and 10 and a regulated voltage at a lower D-C potential would be obtained across load 26.

Although a specific embodiment of the invention has been shown and described, it will be understood that it is but illustrative and that various modifications may be made therein without departing from the spirit and scope of the invention.

What is claimed is:

1. A regulated power supply comprising first and second terminals, an unregulated voltage source connected between said first and second terminals, a source of reference potential, said first terminal being connected to said reference potential, first and second PNPN switches having cathode, anode and gate electrodes, said first and second cathodes being connected to said second terminal, resistance means connecting said first anode to said reference potential, capacitance means connecting said first and second anodes, unilateral conducting means connecting said second anode to said reference potential and poled in the opposite direction from said second switch, a series circuit comprising inductive means and a load impedance connected between said second anode and said reference potential, first pulse generator means having an output conductor, means for connecting said output conductor to said first gate electrode, said first pulse generator means controlling said first switch to conduct and said second switch to cease conduction at predetermined fixed intervals, second pulse generator means having an output conductor, means for connecting said second output conductor to said second gate electrode, said second pulse generator means controlling said second switch to conduct, and error detector means for comparing the voltage across said load impedance to a predetermined voltage, said error detector means including means for supplying an output current to said second pulse generator for controlling the application of pulses to said second gate electrode at a time dependent on the relative magnitudes of said load voltage and said predetermined voltage.

2. A combination in accordance with claim 1 wherein said second pulse generator means includes means for applying said pulses at times dependent on said output current from said error detector, said error detector comprising transistor means having emitter, base and collector electrodes, resistance means connecting said emitter electrode to said second terminal, Zener diode reference voltage means connecting said emitter electrode to said reference potential and poled to be continuously conducting in the reverse breakdown condition, means connecting said base electrode to the junction of said inductive means and said load impedance means for varying the voltage on said base in direct proportion to the voltage across said load impedance means, and means for connecting said collector electrode to said second pulse generator means for supplying said output current to said second pulse generator means.

3. A combination in accordance with claim 2 wherein said first and second pulse generator means each comprises a double-base diode having emitter, first base and second base electrodes, means for connecting said first base electrode to said respective output conductor, resistance means connecting said second base to said reference potential, and means for increasing the voltage on said emitter electrode at a predetermined rate for supplying current pulses to said respective gate electrode when said emitter electrode voltage exceeds the voltage of said second base electrode by an amount equal to a fixed percentage of the voltage between said first and second base electrodes.

4. A combination in accordance with claim 3 wherein said means for connecting said collector electrode to said second pulse generator means joins said collector electrode of said transistor means to said second base electrode of said double-base diode in said second pulse generator means.

5. A combination in accordance with claim 3 wherein said means for increasing said emitter electrode voltage of said double-base diode in said second pulse generator are connected to said anode of said second switch and are operative in response only to said second switch becoming nonconductive.

6. A combination in accordance with claim 1 wherein said inductive means are operative in response to said second switch entering the nonconductive condition for forward biasing said unilateral conducting means and for supplying current to said load impedance means through said unilateral conducting means.

7. A power supply comprising first and second PNPN switches, each having cathode, gate and anode electrodes, first and second sources of potential, said cathodes being connected to said first source, first and second impedance means connecting said respective anodes to said second source, capacitive means connecting said anodes and operative in response to the conduction of one of said switches for terminating the conduction of the other of said switches, load impedance means connected to said second anode, first and second switching means for alternately turning on said first and second switches, and comparator means for comparing the average voltage across said load impedance to a predetermined voltage and for controlling the relative pulse application times of said first and second current pulses to maintain the average voltage across said load impedance equal to said predetermined voltage.

8. A regulated power supply comprising a bistable device having first and second PNPN switches, each having cathode, anode and gate electrodes, first and second sources of potential, said cathode electrodes being connected to said first source, resistance means connecting said first anode to said second source, capacitor means connecting said first and second anodes, unilateral conducting means connecting said second anode to said second source and poled to prevent current flow from said second source to said second switch, a load impedance, inductive means connecting said second anode to said load impedance, said load impedance being connected between said inductive means and said second source, potentiometer means having a center tap connected across said load impedance, the voltage at said center tap being at a fixed percentage of the potential at the junction of said inductive means and said load impedance, a pulse generating circuit for alternately applying pulses to said first and second gate electrodes for switching the state of said bistable device, and means for varying the time between successive pulses in accordance with the potential of said center tap to maintain the potential of said junction equal to a predetermined value.

9. A combination in accordance with claim 8 wherein said load voltage is responsive to the setting of said center tap.

10. A bistable circuit comprising first and second devices having high and low conduction states, biasing means for maintaining either of said devices in said high conduction state, means connecting said devices and operative in response to either of said devices entering said high conduction state for driving said other of said devices into said low conduction state in the event that said other of said devices was priorly maintained in said high conduction state, and means connected to said second device and operative in response to said second device entering said low conduction state for momentarily diverting the current through said first device into said connecting means to drive said first device into said low conduction state.

11. In a regulating circuit: at least two controllable impedance means, said controllable impedance means being connected in parallel with one another and serially disposed between source means and load means; means to periodically and alternately reduce the impedance of said controllable impedance means from a high value; and means responsive to variations in load voltage to control the current flowing through the controllable impedance means having a reduced impedance, the arrangement being such that each controllable impedance means conducts current from said source to said load for only a fraction of the total operating time thereby compensating for load voltage variations.

12. In a regulating circuit: at least two semiconductor current control means having a maximum permissible power dissipation rating, said semiconductor means being connected in parallel with one another and serially disposed between source means and load means; means to periodically and alternately render said semiconductor means conductive in turn; means for deriving signals indicative of variations in load voltage from a predetermined reference level; and feedback means connected to said semiconductor means responsive to said signals for controlling the amount of current flowing from said source to said load.

13. A converter serving to supply variable power to a load from a direct current power source supplying a voltage including a first controlled rectifier for selectively connecting the power source to the load in response to a gating signal, said controlled rectifier having forward and reverse breakdown voltages below which it has a low conductance and gating means responsive to a gating signal for gating the rectifier into a high forward conductance in which state it continues to operate until the current flowing through the same is interrupted, said controlled rectifier having a forward breakdown voltage greater than the power source voltage, storage means, means distinct from said gating means and responsive subsequent to the gating of said rectifier into its high forward conductance state for applying power from the source through said rectifier to the storage means, means for storing power in said storage means, and means for selectively connecting the storage means to the controlled rectifier.

14. A converter serving to supply variable power to a load from a direct current power source supplying a voltage including a first controlled rectifier for selectively connecting the power source to the load in response to a gating signal, said controlled rectifier having forward and reverse breakdown voltages below which it has a low conductance and gating means responsive to a gating signal for gating the rectifier into a high forward conductance in which state it continues to operate until the current flowing through the same is interrupted, said controlled rectifier having a forward breakdown voltage greater than the power source voltage, storage means, means for applying power in a circuit path distinct from said gating means and extending from the source through said rectifier in its high forward conductance state to the storage means, means responsive subsequent to the gating of said rectifier into its high forward conductance state for storing power in said storage means through said circuit path, and means for selectively connecting the storage means to the controlled rectifier.

15. A bistable device comprising first and second PNPN switches, each having cathode, anode and gate electrodes, and each of said switches having high and low current conduction states, an input source of potentials, said cathode electrodes being connected to said input source, output potential means, resistance means connecting said anode electrode of said first switch to said output potential means, capacitor means connecting together said anode electrodes, inductive means connecting said anode electrode of said second switch to said output potential means, and a unidirectional current device connecting said anode electrode of said second switch to said output potential means and being responsive to concurrent low current conduction state of said first switch for maintaining current flow through said inductive means for said output potential means.

16. A regulated power supply including a direct current power source for supplying an unregulated voltage, a converter serving to supply variable power to a load from said source and including a controlled rectifier serving selectively to connect said source to said load, said rectifier having forward and reverse breakdown voltages below which it has a low conductance and gating means responsive to the receipt of a control signal for gating said rectifier into a high forward conductance state in which it continues to operate until the current flowing through said rectifier is interrupted, said rectifier having a forward breakdown voltage greater than said unregulated voltage, sampling means serving to sample said power supplied to said load, means supplying a reference voltage, comparison means serving to compare said sampled power and the supplied reference voltage for deriving an error signal, and control means comprising an oscillatory circuit including a capacitor and being responsive to said signal for providing turn-on and turn-off pulses having a time separation dependent upon said error signal and being effective to control said high and low conduction states of said rectifier.

17. A regulated power supply including a direct current power source of unregulated voltage, a converter serving to supply variable power to a load from said source and including a controlled rectifier serving selectively to connect said source to said load, said rectifier having forward and reverse breakdown voltages below which it has a low conductance and gating means responsive to a control signal for gating said rectifier into a high forward conductance in which state it continues to operate until the current flowing through said rectifier is interrupted, said rectifier having a forward breakdown voltage greater than said unregulated voltage, sampling means serving to sample the power applied to the load, means supplying a reference voltage, comparison means serving to compare said sampled power and the supplied reference voltage for deriving an error signal, control means responsive to said signal for providing turn-on and turn-off pulses having a time separation which is dependent upon the error signal and being effective to control said high and low conduction states of said rectifier.

References Cited
UNITED STATES PATENTS

| | | | |
|---|---|---|---|
| 2,810,105 | 10/1957 | Henrich | 323—4 X |
| 2,965,832 | 12/1960 | Lode | 323—22 X |
| 3,037,158 | 5/1962 | Schmidt | 323—45 X |
| 3,074,008 | 1/1963 | McPhail | 323—22 |

OTHER REFERENCES

Solid State Products, Inc., Applications and Circuit Design Notes, Bulletin D420-02-8-59, August 1959, pp. 15–77.

JOHN F. COUCH, *Primary Examiner.*

LLOYD McCOLLUM, ORIS L. RADER, *Examiners.*

R. J. CRAWFORD, K. W. HADLAND, W. H. BEHA,
*Assistant Examiners.*